July 9, 1929.  E. O. SHREFFLER ET AL  1,720,098
ROTARY INTERNAL COMBUSTION ENGINE
Filed March 3, 1926  6 Sheets-Sheet 4
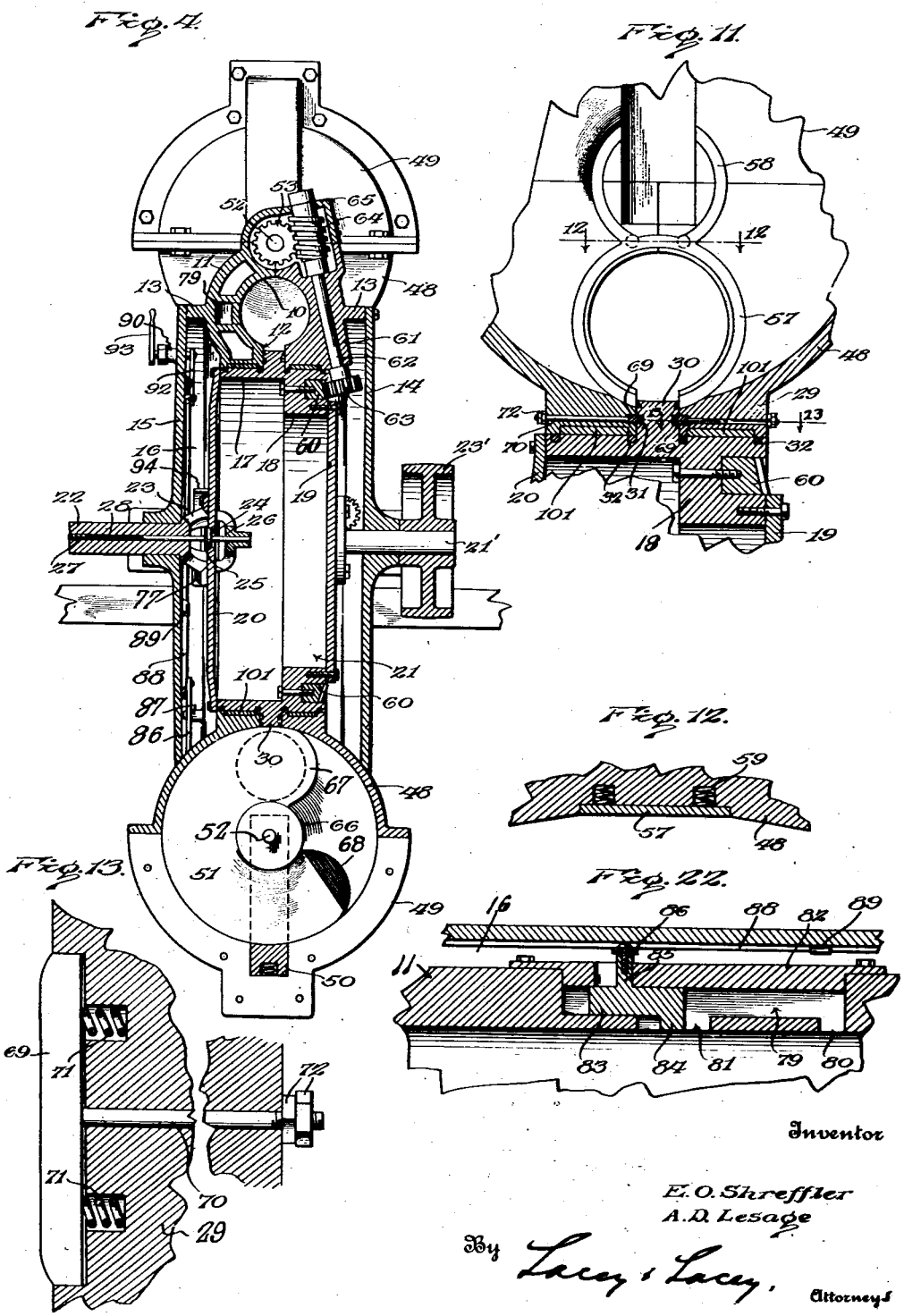
Inventor
E. O. Shreffler
A. D. Lesage
By Lacey & Lacey, Attorneys

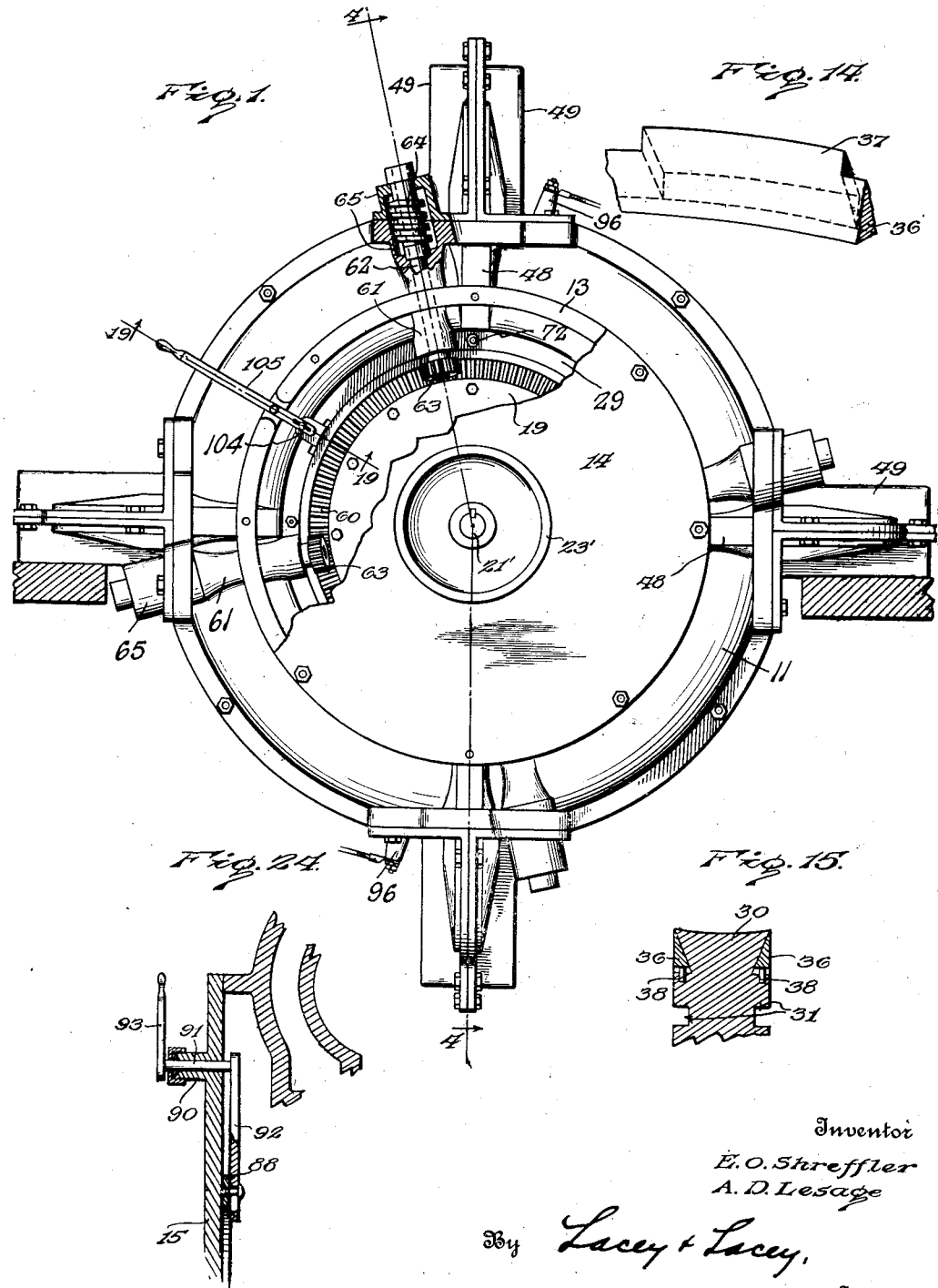

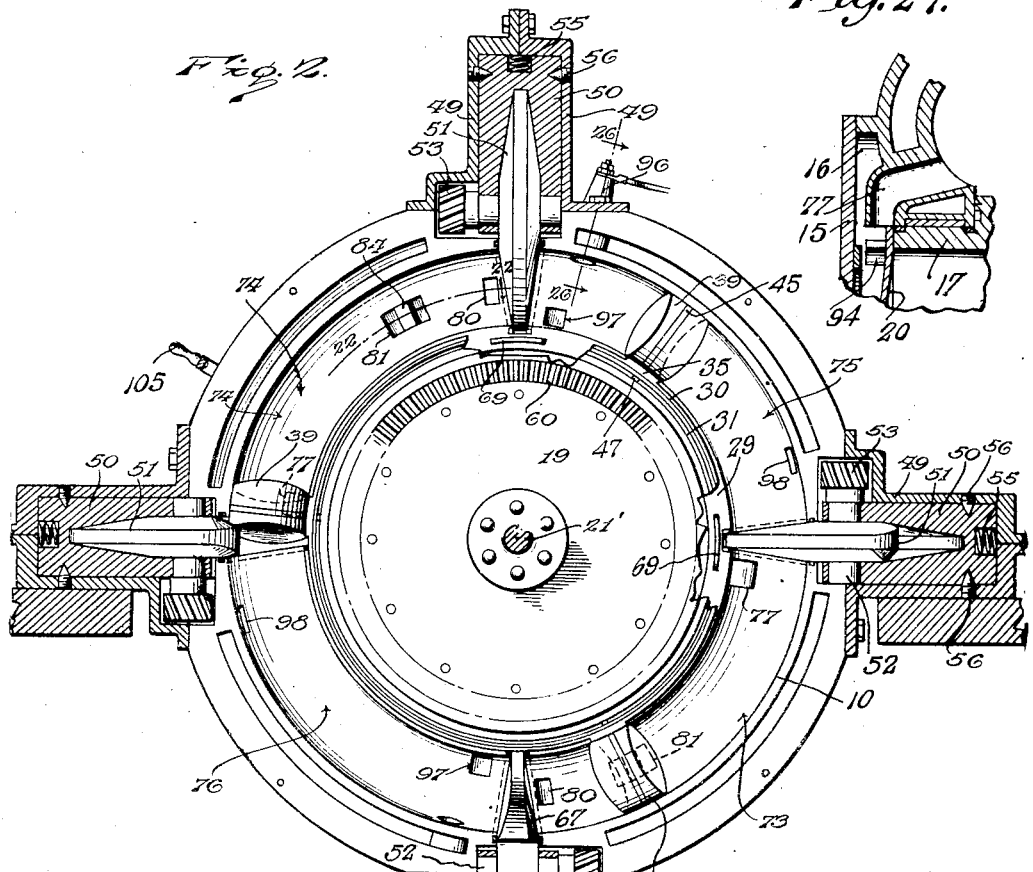
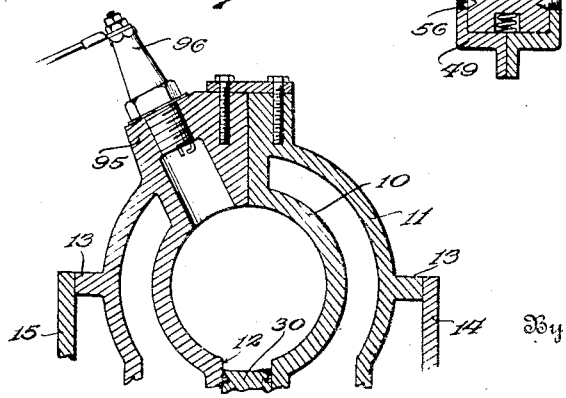
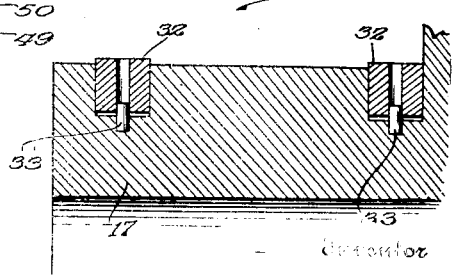

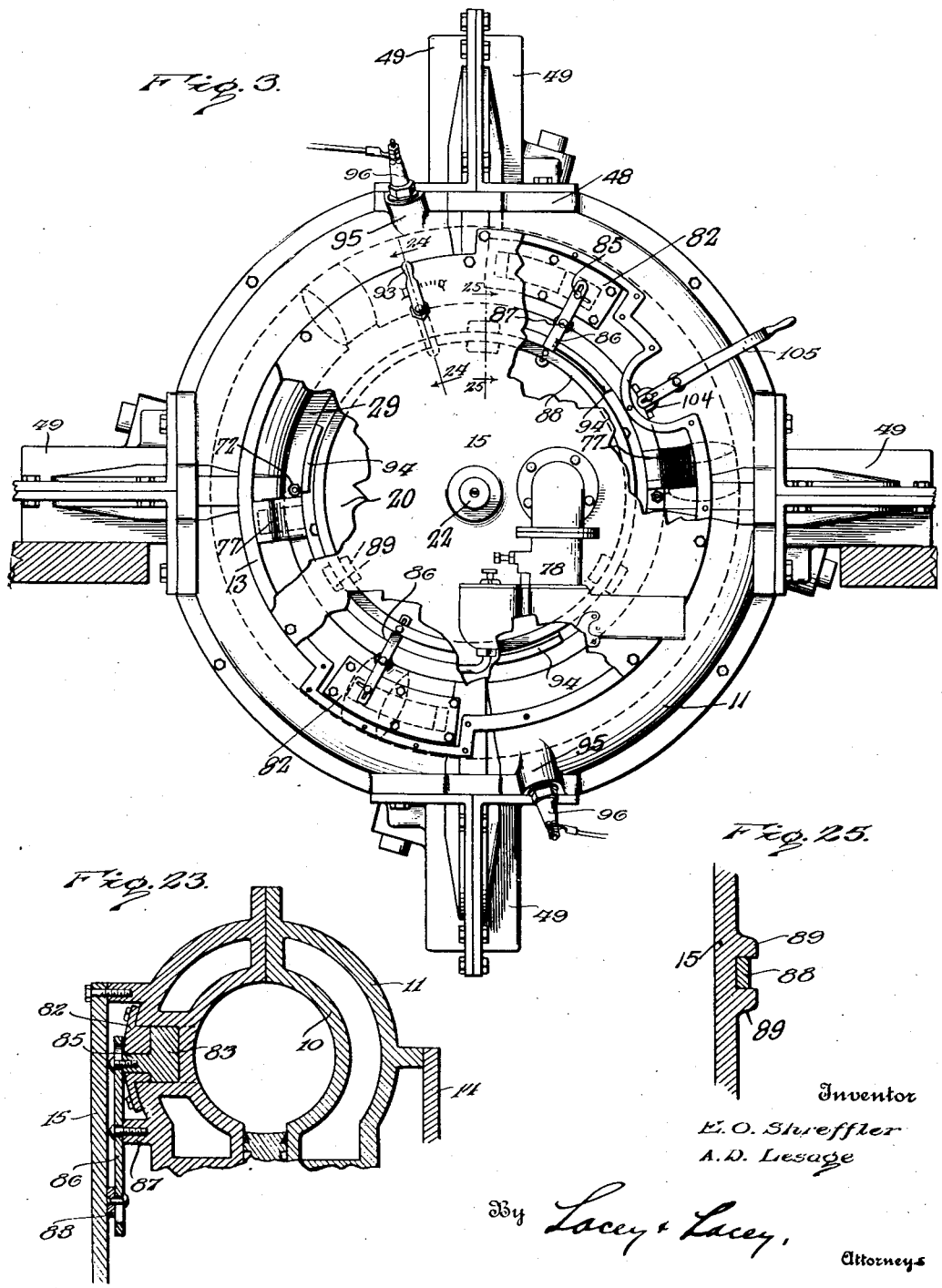

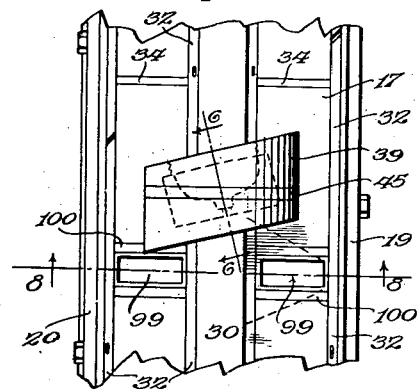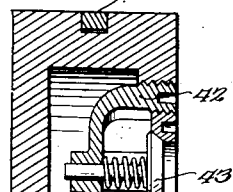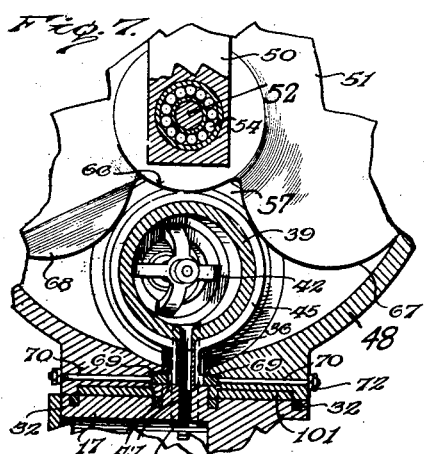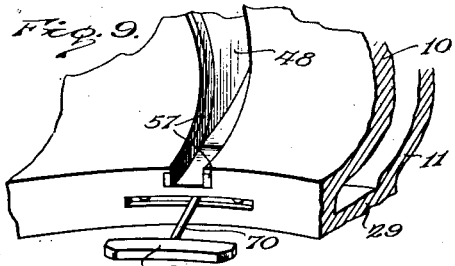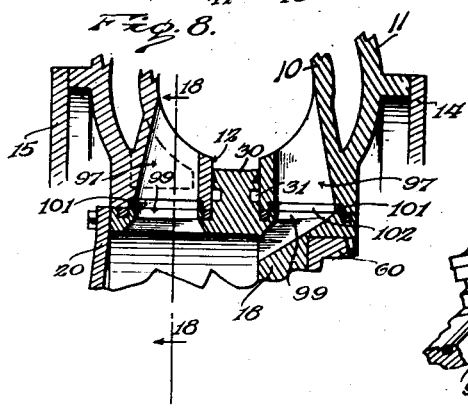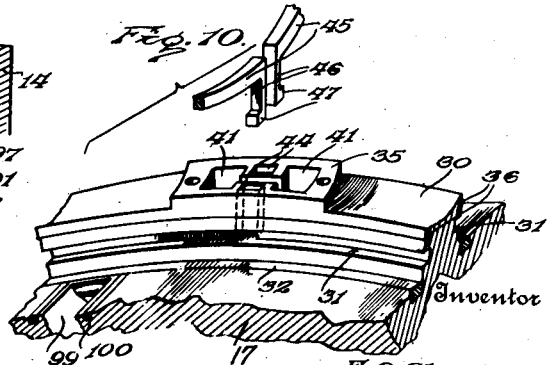

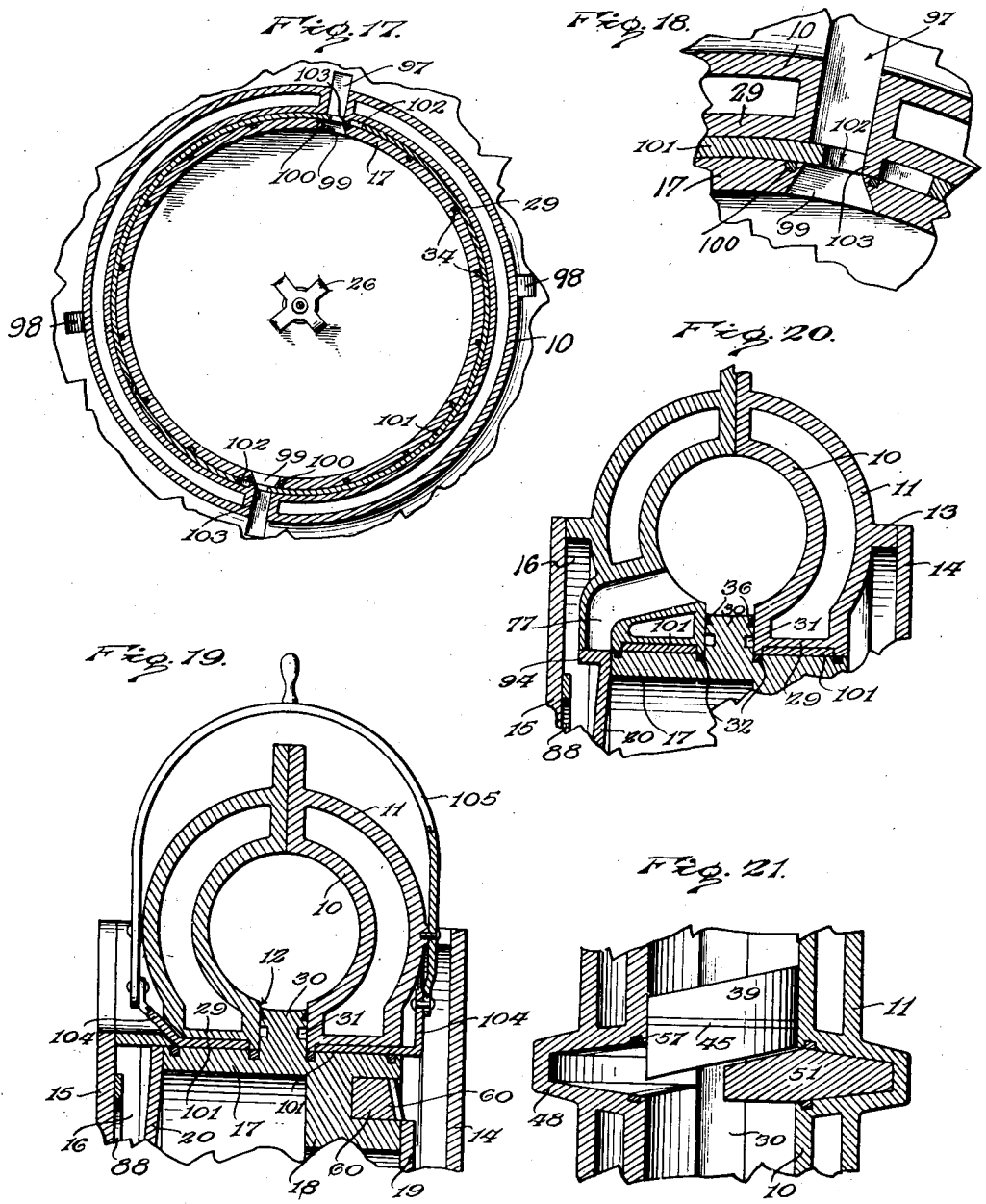

Patented July 9, 1929.

1,720,098

UNITED STATES PATENT OFFICE.

ELWYNE O. SHREFFLER AND AARON D. LESAGE, OF MANTENO, ILLINOIS.

ROTARY INTERNAL-COMBUSTION ENGINE.

Application filed March 3, 1926. Serial No. 92,059.

This invention relates to rotary internal combustion engines and seeks, among other objects, to provide an engine which, for any given number of pistons used will deliver maximum power with a practically even and continuous torque.

The invention seeks, as a further object, to provide an engine wherein the functions of intake, compression, storage and transfer of the fuel mixture will be accomplished automatically, as will also the exhaust of the spent gases, and wherein the use of valves in connection with such functions will, with the exception of the storage of the fuel mixture, be eliminated.

A further object of the invention is to provide an engine wherein the rotor will be employed as a storage chamber for the fuel mixture, wherein means will be provided for automatically releasing some of the mixture and relieving the chamber so as to prevent the building up in said chamber of an undesirably high compression of the fuel mixture, wherein means will be provided for varying the maximum pressure of the fuel mixture in said chamber, and wherein the fuel mixture released from the chamber will be discharged into the main intake chamber of the engine to be subsequently utilized.

Another object of the invention is to provide manually adjustable means for varying the instant of transfer of the compressed fuel mixture from the storage chamber to the firing chambers of the engine.

Still another object of the invention is to provide manually adjustable means for varying the volume of fuel mixture pumped into the storage chamber.

And the invention seeks, as a still further object, to provide an engine wherein the endless annular cylinder employed will be divided into separate chambers by a plurality of rotary abutments and wherein the pistons and the abutments will be so formed that the opening and closing period of each abutment will overlap the period required for any one of the pistons to pass said abutment so that the loss of fuel mixture as well as the loss of compression will be reduced to a minimum.

Other objects of the invention not specifically mentioned in the foregoing, will appear during the course of the following description.

In the accompanying drawings:

Figure 1 is a side elevation of our improved engine, parts being broken away and shown in section.

Figure 2 is a side elevation showing one of the cylinder sections of the casing removed.

Figure 3 is an elevation looking at the side of the engine opposite to that shown in Figure 1, parts being broken away.

Figure 4 is a vertical sectional view on the line 4—4 of Figure 1, looking in the direction indicated by the arrows.

Figure 5 is a fragmentary plan view looking at the rotor and particularly showing one of the pistons.

Figure 6 is a detail sectional view on the line 6—6 of Figure 5, looking in the direction indicated by the arrows.

Figure 7 is a fragmentary sectional view showing one of the abutments open and illustrating a piston passing the abutment.

Figure 8 is a detail sectional view on the line 8—8 of Figure 5, looking in the direction indicated by the arrows, and showing a typical pair of the transfer ports of the rotor as well as the pair of inlet ports of one of the firing chambers.

Figure 9 is a fragmentary perspective view particularly showing a portion of one of the abutment chambers of the annular cylinder.

Figure 10 is a fragmentary perspective view particularly showing one of the piston saddles of the rotor.

Figure 11 is a fragmentary sectional view particularly showing one of the abutment packing members.

Figure 12 is a detail sectional view on the line 12—12 of Figure 11, looking in the direction indicated by the arrows.

Figure 13 is a detail sectional view on the line 13—13 of Figure 11, looking in the direction indicated by the arrows, and showing one of the compressing cams for the piston packing rings.

Figure 14 is a fragmentary perspective view showing a portion of one of the center flange packing rings of the rotor.

Figure 15 is a detail sectional view taken through the center flange of the rotor and showing the packing rings thereon.

Figure 16 is a detail sectional view particularly showing a typical pair of the peripheral packing rings of the rotor.

Figure 17 is a sectional view particularly showing one of the transfer timing rings of the cylinder.

Figure 18 is an enlarged sectional view on the line 18—18 of Figure 8, looking in the direction indicated by the arrows, and showing one of the transfer timing rings of the cylinder as well as one of the transfer ports of the rotor, this figure being an enlargement of a part of Figure 17.

Figure 19 is an enlarged sectional view on the line 19—19 of Figure 1, looking in the direction indicated by the arrows, and showing the hand lever for adjusting the transfer timing rings.

Figure 20 is a fragmentary sectional view showing the intake port of one of the induction chambers.

Figure 21 is a fragmentary sectional view particularly showing one of the abutments and one of the pistons.

Figure 22 is a detail sectional view on the line 22—22 of Figure 2, looking in the direction indicated by the arrows, and particularly showing the bypass of one of the induction chambers of the annular cylinder as well as the timing member in said bypass.

Figure 23 is a detail sectional view more particularly showing the mounting of the bypass timing members.

Figure 24 is a sectional view on the line 24—24 of Figure 3, looking in the direction indicated by the arrows, and showing the hand lever for adjusting the bypass timing members.

Figure 25 is a detail sectional view on the line 25—25 of Figure 3, looking in the direction indicated by the arrows, and showing the mounting of the coupling rings for the levers of the bypass timing members.

Figure 26 is a detail sectional view on the line 26—26 of Figure 2, looking in the direction indicated by the arrows, and showing the mounting of one of the spark plugs.

Figure 27 is a detail section similar to Figure 20 but showing the intake port as opened.

In carrying the invention into effect, we employ a casing embodying an annular cylinder 10 which is preferably provided with a jacket 11 and is formed of mating sections bolted together at their outer peripheries. Opening into the cylinder 10 at its inner circumference is a medial annular channel 12, and projecting laterally from the jacket 11, as shown in Figure 4, are annular flanges 13 to which are detachably secured side plates 14 and 15 closing the casing to provide a main intake chamber 16 within the casing. Concentrically mounted within the casing is a cylindrical rotor 17 provided at one side thereof with a thickened inwardly directed annular flange 18, and detachably secured to said flange and to the edge of the rotor at its opposite side are side plates 19 and 20 closing the rotor whereby the interior thereof will constitute a fuel mixture storage chamber 21. Fixed to the side plate 19 is a shaft 21' journaled through the side plate 14 of the casing, and fixed to the side plate 20 of the rotor is an alined shaft 22 journaled through the side plate 15 of the casing, the side plates of the casing being provided with suitable bearings to accommodate said shafts. Formed on the shaft 22 at its inner end is a spider 23 straddling a port 24 in the side plate 20 of the rotor, and normally closing said port is a relief valve 25, the outer end of the stem of which is slidable in an axial bore in the shaft 22 while the inner end of said stem is slidably supported by a guide member 26 fixed to the inner side of the plate 20. Engaged in the outer end of said bore is an abutment screw 27, and confined between said screw and the outer end of the valve stem is a spring 28 normally holding the valve closed. Either or both of the shafts 21 and 22 may be equipped with a power transmitting device as, for instance, a pulley, as conventionally illustrated at 23'.

The cylinder 10 is provided at its inner periphery with a smooth annular wall 29 to closely surround the rotor, and radiating from the rotor is a medial annular flange 30 which rotatably fits in the channel 12 of the cylinder and is provided in its opposite sides with annular grooves 31. Countersunk in the rotor to cooperate with the cylinder wall 29 are pairs of split resilient packing rings 32 located at opposite sides of the flange 30, and locking said rings against independent movement on the rotor, as seen in Figure 16, are pins 33 freely accommodated in suitable radially elongated openings in said rings. Countersunk in the periphery of the rotor to extend transversely between each pair of the rings 32, as seen in Figure 5, are circumferentially spaced packing cleats 34. Formed on the flange 30 of the rotor, at equally spaced points, are piston saddles 35, and countersunk in the side faces of said flange are split resilient packing rings 36 bearing against the side walls of the channel 12. As best shown in Figures 10 and 14 of the drawings, these rings are provided at the piston saddles 35 with thickened widened portions 37 which overlie the sides of the piston saddles and are formed with beveled inner faces coacting therewith, while, as brought out in detail in Figure 15, the rings are also formed with beveled inner faces to coact with the flange 30 of the rotor, the rings being substantially triangular in cross section. Accordingly, the tendency of the rings to expand will serve to compress the rings with the portions 37 thereof tightly against the side walls of the channel 12 to maintain sealed joints between the flange 30 and said walls. Formed in the inner peripheries of the rings at suitably spaced points are transverse grooves and freely accommodated in said grooves are pins 38 locking the rings against independent rotation.

In the present instance, we have shown the flange 30 of the rotor as provided with three of the piston saddles 35, and fixed on said saddles are hollow pistons 39 slidably fitting in the cylinder 10. As shown in Figure 6, the pistons are detachably secured to the saddles by bolts 40 while the interior cavities of said pistons are connected with the storage chamber 21 of the rotor by inlet passages 41 extending through said saddles into the rotor. Screwed through the forward side walls of the pistons are valve cages 42 and slidably supported by said cages are inwardly opening check valves 43 spring pressed to closed position for cutting off the escape of compressed fuel mixture from the storage chamber.

As best seen in Figure 10, the piston saddles 35 are provided with radial openings 44, the lower ends of which enter the grooves 31 of the flange 30 of the rotor, and countersunk in the pistons 39 to cooperate with the wall of the cylinder 10 are medially disposed resilient packing rings 45 provided at their ends with depending legs 46 freely received through the openings 44 of said saddles. The legs of the rings are formed at their free ends with lateral lugs 47 which project into the grooves 31 for locking the rings against displacement, and it is now to be observed that the legs 46 are of reduced thickness and may accordingly shift laterally within the openings 44 of the piston saddles so that the rings may freely expand against the cylinder wall.

At quadrantly spaced points the cylinder 10 is formed with the inner sections 48 of laterally enlarged abutment housings which lie at right angles to the cylinder, and bolted to said inner sections of the housings are the outer sections 49 thereof, these latter sections being formed of companion detachably connected members so that the abutments and associated parts may be readily assembled within the housings. Slidable radially in said housings are abutment carriers 50, and journaled on said carriers are circular abutments 51. The carriers are notched at their inner ends to snugly but rotatably accommodate the abutments, and extending through the respective carriers and abutments are shafts 52 each provided at one end with a worm gear 53. As shown in Figure 7, the carriers are equipped with suitable bearings 54 for said shafts so that the abutments may turn freely upon the carriers. The abutments normally bear at their peripheries against the peripheral edge of the flange 30 of the rotor, which edge is slightly concave to fit the contour of the peripheral edges of the abutments, and accommodated in suitable recesses in the outer ends of the carriers 50, as best seen in Figure 2, are springs 55 pressing the carriers inwardly so that the abutments will be held firmly against said flange. Limiting the inward movement of the carriers are pairs of oppositely disposed stop screws 56 pointed at their inner ends to engage in correspondingly shaped sockets in the carriers so that by backing the screws out of said sockets, the carriers may be permitted to shift inwardly under the action of the springs 55 for taking up wear on the periphery of the rotor flange 30 and on the peripheries of the abutments. Countersunk in the side walls of the abutment housings, as best seen in Figure 11, are packing members each of which comprises a split resilient ring 57 disposed concentrically of the cylinder 10, and an integral split resilient ring 58 rising from the ring 57 opposite the split therein. The rings 57 are of a diameter somewhat greater than the internal diameter of the cylinder and bear at their ends against the packing rings 36 of the rotor flange 30 while the ends of the rings 58 terminate at the side faces of the carriers 50 so that the carriers may shift between the ends of the latter rings, and pressing the packing members against the side faces of the abutments, as shown in Figure 12, are pairs of springs 59 countersunk in the wall of the abutment housing at the outer periphery of the cylinder, the pairs of springs 59 bearing against the packing members at the junctions of the rings 57 and 58 thereof. Countersunk in the flange 18 of the rotor is a gear ring 60 detachably secured to said flange by suitably spaced cap bolts, and formed on the cylinder 10 at corresponding sides of the abutment housings are radially disposed bearings 61 through which are journaled shafts 62. Fixed to the inner ends of said shafts are pinions 63 meshing with the gear ring 60, and fixed to the outer ends of said shafts are worms 64 meshing with the worm gears 53, the worms and worm gears being enclosed within chambers 65 on the abutment housings. Thus, as will be perceived, the abutments will be rotated as the rotor revolves.

Formed in each abutment 51, as particularly seen in Figures 4 and 7, is a notch 66 which, when brought into register with the cylinder 10, freely accommodates the pistons 39 therethrough and, in this connection, it should be observed that the abutments are turned three complete revolutions for each revolution of the rotor so that as the several pistons travel in the cylinder 10, the notches of the abutments will be brought into position at the cylinder to permit the pistons to pass. As shown in Figure 2, the abutments are tapered toward their peripheries so that their side faces are thus inclined to conform somewhat to the inclination of the end faces of the pistons as shown in Figure 21, and formed on each abutment at the notch 66 therein is a leading lip 67 beveled at one side thereof, and a trailing lip 68 beveled at its opposite side. The abutments are turned in a counterclockwise direction and attention is now directed to the fact that, as best shown in Figure 5, the parallel end walls of the pistons are inclined toward corresponding sides of the pistons away from the leading sides thereof. Accordingly, as the front face of each piston crosses the plane of any abutment, the beveled lip 68 of said abutment will travel across said face in close parallel relation thereto while, as the rear face of the piston crosses the plane of the abutment, the beveled lip 67 will travel across the latter face in close parallel relation thereto. The period of opening and closing of each abutment thus overlaps the period required for a piston to pass the abutment and, accordingly, the interval during which the abutment is effectively open is correspondingly shortened.

As shown in Figure 7, the rings 58 of the abutment packing members are at all times covered by the abutments and since the pairs of springs 59 are located at the junction of said rings with the rings 57, as previously indicated, so that the pressure of said springs will be sustained by the abutments when open, tilting of the packing members out of the grooves therefor will be prevented. Partially countersunk in the walls of the channel 12 beneath each of the abutments, as best shown in Figures 7, 9 and 13 of the drawings, are pairs of oppositely disposed cam members 69 which are slidably received in the grooves 31 of the rotor flange 30, and extending from said cam members laterally through the wall 29 of the cylinder 10 are stems 70. Arranged behind the cam members are pairs of springs 71 pressing the cam members inwardly into said grooves, and screwed on the outer ends of said stems are nuts 72. Thus, as will be seen, as each piston 39 reaches one of the abutment chambers, the pair of cam members 69 at said chamber will engage the lugs 47 on the legs 46 of the packing ring 45 of said piston and shift said legs laterally within the openings 44 of the saddle 35 of the piston for compressing the packing ring and holding said ring compressed while the piston travels through the abutment housing. In the absence of the cam members 69, the ring 45 of each of the pistons would, as the piston passed into any one of the abutment housings, expand so as to lodge against the cylinder wall as the piston passed out of said housing. However, as brought out in Figure 7, the cam members 69 will, as previously noted, hold the rings compressed, the pairs of springs 71 behind the cam members being of greater tension than the tension of the packing rings and, of course, wear on the cam members as well as wear on the lugs 47 of the legs of the packing rings may be taken up by adjustment of the nuts 72 outwardly on the stems 70 of the cam members to permit inward movement of said members by the springs 71.

As shown in Figure 2, the abutments 51 divide the cylinder 10 into a pair of oppositely disposed induction and compression chambers 73 and 74 and a pair of intervening firing chambers 75 and 76. Leading from the main intake chamber 16 into the chambers 73 and 74 near corresponding ends thereof, as seen in Figures 3 and 20, are inlet passages 77, and connected to the side plate 15 of the engine casing, as shown in Figure 3, is an approved carbureter 78 delivering into the main intake chamber. Accordingly, as each piston 39 advances through either of the chambers 73 or 74, suction will be created behind said piston for drawing fuel mixture from the carbureter into the chamber 16 and thence through one of the passages 77 into said induction and compression chamber. Coincidently, as each piston advances through either of the chambers 73 or 74, said piston will compress, between it and the abutment at the forward end of the chamber, the fuel mixture drawn into the chamber by the preceding piston so that the compressed fuel mixture will cause the check valve 43 of the piston to open, whereupon the fuel mixture in front of the piston will be forced through the piston and through the connecting passages 41 therefor into the storage chamber 21 of the rotor. The fuel mixture will, therefore, be stored and compressed in the storage chamber. When the pressure of the mixture in said chamber becomes sufficient to overcome the tension of the spring 28 on the relief valve 25, said valve will then be opened to permit the escape of some of the compressed mixture through the port 24 into the chamber 16, from which latter chamber the escaped mixture will, as the engine continues in operation, be again taken into the chambers 73 and 74, along with fresh fuel mixture drawn in from the carbureter, and reintroduced into the storage chamber. Loss of the fuel mixture will thus be avoided and as will be perceived the pressure of the mixture in the storage chamber may be varied by adjusting the screw 27 to vary the tension of the spring 28 on the relief valve 25.

Formed in one side of the cylinder 10 near the compression ends of the chambers 73 and 74, as seen in Figure 22, are bypasses 79 having inlet ports 80 located close to the adjacent abutments 51 and outlet ports 81 spaced back from the inlet ports. As shown in Figure 23, the bypasses are closed at their outer sides by cover plates 82 bolted to the jacket 11, and slidable in the discharge ends of said bypasses are timing members 83 having lugs 84 projecting into the ports 81. Extending from the members 83 at their outer sides are stems 85 which are slidably received through suitable slots in the cover plates 82, and pivotally connected at their outer ends with said stems are levers 86 which are mounted to rock upon bosses 87 projecting from the jacket 11 at points radially inward from said slots. Lying against the inner side of the cover plate 15 of the engine casing, as seen in Figures 3 and 4, is a coupling ring 88 with which the inner ends of the levers 86 are pivotally connected, and projecting from the plate at suitably spaced points, as shown in detail in Figure 25, are pairs of spaced lugs 89 rotatably supporting the ring. Near its highest peripheral point, the plate 15 is, as seen in Figure 24, provided with a bearing 90, and journaled through said bearing is a shaft 91 provided at its inner end with a lever 92 pivotally connected with the ring 88 while to the outer end of said shaft is fixed a hand lever 93. Thus, the hand lever 93 may be rocked for rotating the ring 88 and shifting the timing members 83.
Formed on the side plate 20 of the rotor, as seen in Figures 3, 20 and 27 of the drawings, are suitably spaced lateral flanges or lugs 94 disposed to momentarily close the inlet passages 77 of the chambers 73 and 74 as the rotor revolves, Figure 20 showing a flange in the closing position, and Figure 27 showing the flange or lug in the opening position. These flanges are so arranged that as each piston 39 travels forwardly in either chamber, and after a quantity of fuel mixture has been drawn into the chamber, a corresponding flange will close the intake passage of said chamber so that as the piston continues forwardly, a partial vacuum will be created in the chamber behind the piston while compression of the fuel mixture in front of the piston will continue until said piston passes over the outlet port 81 of the bypass 79 of said chamber. Thus, as the piston reaches a position between the ports 80 and 81 of the bypass, the portion of the compressed mixture in front of the piston not forced past the check valve 43 of the piston into the storage chamber of the rotor, will be induced by the partial vacuum, through the bypass behind the piston before the abutment at the forward end of the chamber begins to open. Accordingly, practically none of the fuel mixture will be permitted to escape past said abutment into the next firing chamber of the cylinder 10. Since the instant of the bypassing of the compressed fuel mixture in front of the piston is determined by the travel of the piston across the port 81 of the bypass, it will be seen that by adjusting the timing member 83 of the bypass forwardly to advance the lug 84 thereof in the port 81, the instant of bypassing of the compressed fuel mixture may be retarded.
Accordingly, under such condition, the fuel mixture in front of the piston will, before the abutment at the adjacent end of the chamber opens, be more highly compressed with the result that a greater quantity of the mixture will be forced past the check valve 43 of the piston into the storage chamber 21 of the rotor. Conversely, by adjusting the timing member 83 of the bypass rearwardly to retract the lug 84 thereof in the bypass port 81, the instant of uncovering of said port by the piston will be advanced with the result that a less quantity of the fuel mixture in front of the piston will be forced into the storage chamber. Accordingly, as will be seen, the hand lever 93 may be adjusted to control the quantity of fuel mixture compressed in the storage chamber.

Formed on the cylinder 10 at corresponding ends of the firing chambers 75 and 76, as shown in detail in Figure 26, are bosses 95 having passages opening into said chambers, and screwed into the outer ends of said passages are appropriate spark plugs 96. At their same ends, the chambers 75 and 76, as shown in detail in Figure 8, are further provided with pairs of inlet passages 97 while near the opposite ends of the chambers are formed exhaust ports 98 open to the atmosphere. As will be observed, the passages 97 extend through the wall 29 of the cylinder 10 at opposite sides of the channel 12, and formed in the peripheral wall of the rotor 17 are pairs of transfer ports 99 disposed to be brought into register with said passages as the rotor revolves, packing cleats 100 being provided, as shown in Figures 5 and 10, at the front and rear of each of said ports.

Countersunk in the wall 29 of the cylinder 10 is a pair of rotatable split resilient timing rings 101 disposed in contact with the rotor 17 between the pairs of packing rings 32 thereon. The rings 101 are provided at the inlet passages 97 of the chambers 75 and 76 with openings 102 disposed to register with said passages, and formed on the cylinder wall 29 to project into said openings, as seen in Figure 18, are stop lugs 103, engageable by the end walls of said openings for limiting the rotative movement of the rings. Formed on the rings, as seen in Figure 19, are oppositely disposed lateral ears 104, the ear of the ring at the side of the engine casing with the intake chamber 16 being accommodated through a suitable slot in the cylinder wall 29, and mounted to rock upon the cylinder is a straddling hand lever 105 pivotally connected with said ears. Thus, the hand lever may be swung for rotating the rings 101.

As a piston 39 moves into either of the firing chambers 75 and 76, a pair of the transfer ports 99 of the rotor will, immediately after the piston advances beyond the inlet passages 97, be brought into register with said passages, and a charge of the compressed fuel mixture in the storage chamber 21 of the rotor will be released from said storage chamber into said firing chamber behind the piston. Continued rotation of the rotor 17 will then serve to shift the transfer ports 99 out of register with the inlet passages of the firing chamber and close said passages, whereupon the fuel charge is ignited by means of the spark plug 96 of said chamber. The piston will thus be driven forwardly in the chamber to cross over the exhaust port 98 of said chamber, and the spent gases will exhaust through said port to the atmosphere. As will be perceived, the transfer of the fuel mixture from the storage chamber 21 of the rotor to the firing chamber is controlled by the instant of registration of the pair of transfer ports 99 with the adjacent openings 102 of the timing rings 101 at the inlet passages 97 of said chamber. Accordingly, as will be seen, by adjusting the rings in a counterclockwise direction, as seen in Figure 18, the instant of transfer of the fuel mixture to the firing chamber may be advanced for allowing a greater length of time for the flow of the compressed fuel mixture from the storage chamber into the firing chamber at high speeds of the engine, while, by adjusting said rings in a clockwise direction, the instant of transfer of the fuel mixture may be retarded. Furthermore, as will be seen, as the instant of transfer of the fuel mixture is advanced, the adjacent openings 102 of said rings will be moved more fully into register with the passages 97 of the chamber so that as the length of time allowed for the transfer of the compressed mixture is increased, said mixture will be admitted to the firing chamber in greater volume. Conversely, as the instant of transfer of the fuel mixture is retarded, a correspondingly less volume of the mixture will be admitted to the firing chamber. The fuel mixture transfer timing rings 101 therefore also constitute throttle valve rings which may be adjusted for controlling the speed of the engine.

Referring now more particularly to Figure 2 of the drawings, it will be seen that when the engine is in operation, a charge of fuel mixture will be exploded behind each piston traveling through the chamber 75 as well as behind each piston traveling through the chamber 76, the explosions occurring in said chambers alternately. Accordingly, the rotor will receive a power impulse at each sixth of a turn. As each piston travels through the chamber 75, said piston will scavenge the chamber of burnt gases remaining therein from the previous explosion in said chamber and, of course, a like scavenging of the chamber 76 will also take place. Furthermore, as each piston travels through the chamber 73, fuel mixture will be drawn into said chamber behind the piston while the fuel mixture drawn into the chamber behind the preceding piston will be compressed in front of the succeeding piston in the chamber and forced into the storage chamber 21 of the rotor. Like functions will, of course, attend the travel of each piston through the chamber 74. An ample supply of compressed fuel mixture will thus be maintained in the storage chamber so that the engine will operate smoothly and without interruption.

Having thus described the invention, what we claim is:

1. In a rotary internal combustion engine, an annular cylinder, a hollow circular rotor journaled axially of said cylinder and having its interior constituting a fuel mixture storage chamber, shiftable abutments dividing said cylinder into induction and firing chambers of constant capacity, pistons fixed radially to and carried by the rotor to travel in said cylinder through said induction and firing chambers and having passages in communication with the storage chamber for forcing fuel mixture from said induction chamber of the cylinder into said storage chamber of the rotor under compression, means for intermittently releasing the compressed mixture from the storage chamber of the rotor to said firing chamber of the cylinder, and means in the rotor for controlling the pressure of the mixture stored in said storage chamber.

2. In a rotary internal combustion engine, an annular cylinder, a hollow circular rotor journaled axially of said cylinder and having its interior constituting a fuel mixture storage chamber, shiftable abutments dividing said cylinder into induction and firing chambers, pistons fixed radially to and carried by the rotor to travel in said cylinder through said induction and firing chambers and having passages in communication with the storage chamber for forcing fuel mixture from said induction chamber into said storage chamber of the rotor under compression, means for intermittently releasing the compressed mixture from the storage chamber of the rotor to said firing chamber, of the cylinder, and means in one side of the rotor for relieving the storage chamber of the rotor at a predetermined pressure of the mixture therein.

3. In a rotary internal combustion engine, a casing providing an intake chamber at one side and including an annular cylinder, a rotor journaled axially of said cylinder and providing a fuel mixture storage chamber, shiftable abutments dividing said cylinder into induction and firing chambers, the induction chamber being in communication with said intake chamber, pistons fixed to the rotor to travel in said cylinder through induction and firing chambers of the cylinder and having passages in communication with the storage chamber for forcing fuel mixture from said induction chamber into the storage chamber of the rotor under compression, means for intermittently releasing the compressed mixture from the storage chamber of the rotor, to said firing chamber of the cylinder, and means for releasing the compressed mixture from the storage chamber of the rotor into said intake chamber of the casing at a predetermined pressure of the mixture in the storage chamber.

4. In a rotary internal combustion engine, a casing providing an intake chamber at one side and including an annular cylinder, a rotor mounted axially of said cylinder and providing a fuel mixture storage chamber, a shaft carried by the rotor and journaled through the casing, shiftable abutments dividing said cylinder into induction and firing chambers, the induction chamber being in communication with the intake chamber of the casing, pistons fixed to the rotor to travel in said cylinder through the induction and firing chambers for aspirating fuel mixture from said intake chamber into the induction chamber and forcing fuel mixture in the induction chamber into the storage chamber of the rotor under compression, means for intermittently releasing the compressed mixture from the storage chamber to said firing chamber, and a spring pressed relief valve carried by said shaft for releasing the compressed mixture from the storage chamber of the rotor into said intake chamber of the casing at a predetermined pressure of the mixture in the storage chamber.

5. In a rotary internal combustion engine, an annular cylinder, a rotor journaled axially of said cylinder and providing a fuel mixture storage chamber, shiftable abutments dividing said cylinder into induction and firing chambers, pistons carried by the rotor to travel in said cylinder through said latter chambers for forcing fuel mixture from said induction chamber into said storage chamber under compression, means for intermittently releasing the compressed mixture from the storage chamber to said firing chamber, and means for varying the instant of release of the compressed mixture.

6. In a rotary internal combustion engine, an annular cylinder, a rotor journaled axially of said cylinder and providing a fuel mixture storage chamber, shiftable abutments dividing said cylinder into induction and firing chambers, pistons carried by the rotor to travel in said cylinder through said latter chambers for forcing fuel mixture from said induction chamber into said storage chamber under compression, means for intermittently releasing the compressed mixture from the storage chamber to said firing chamber, and a timing ring carried by said cylinder to encircle the rotor and adjustable for varying the instant of release of the compressed mixture.

7. In a rotary internal combustion engine, an annular cylinder, a hollow circular rotor journaled axially of said cylinder and having its interior constituting a fuel mixture storage chamber, shiftable abutments dividing said cylinder into induction and firing chambers, said firing chamber being provided with an inlet passage, and hollow pistons fixed radially to and carried by the rotor to travel in said cylinder through said induction and firing chambers for forcing fuel mixture from said induction chamber through the pistons into said storage chamber under compression, the rotor being provided with a transfer port to intermittently register with said inlet passage of the firing chamber for releasing compressed fuel mixture from the storage chamber of the rotor to said firing chamber.

8. In a rotary internal combustion engine, an annular cylinder, a rotor journaled axially of said cylinder and providing a fuel mixture storage chamber, shiftable abutments dividing said cylinder into induction and firing chambers, said firing chamber being provided with an inlet passage, pistons carried by the rotor to travel in said cylinder through said latter chamber for forcing fuel mixture from said induction chamber into said storage chamber under compression, the rotor being provided with a transfer port to intermittently register with said inlet passage for releasing compressed fuel mixture from the storage chamber to said firing chamber, and throttling means adjustable for varying the effective area of said inlet passage and coincidently varying the instant of release of the compressed mixture.

9. In a rotary internal combustion engine, an annular cylinder, a rotor journaled axially of said cylinder and providing a fuel mixture storage chamber, shiftable abutments dividing said cylinder into induction and firing chambers, said firing chamber being provided with an inlet passage, pistons carried by the rotor to travel in said cylinder through said latter chambers for forcing fuel mixture from said induction chamber into said storage chamber under compression, the rotor being provided with a transfer port to intermittently register with said inlet passage for releasing compressed fuel mixture from the storage chamber to said firing chamber, a rotatable valve ring carried by the cylinder between said cylinder and the rotor and provided with an opening to register with said passage, and means for rotating said ring and varying the effective area of said opening in register with said passage.

10. In a rotary internal combustion engine, an annular cylinder, a hollow rotor journaled axially of said cylinder and having its interior constituting a fuel mixture storage chamber, shiftable abutments dividing said cylinder into induction and firing chambers, pistons carried by the rotor to travel in said cylinder through said induction and firing chambers and having passages communicating with the storage chamber of the rotor for forcing fuel mixture from said induction chamber into said storage chamber under compression, means for intermittently releasing the compressed mixture from the storage chamber to said firing chamber, and means on the cylinder for varying the quantity of fuel mixture forced into the storage chamber from the induction chamber by the piston.

11. In a rotary internal combustion engine, an annular cylinder, a rotor journaled axially of said cylinder and providing a fuel mixture storage chamber, shiftable abutments dividing said cylinder into induction and firing chambers, pistons carried by the rotor to travel in said cylinder through said latter chambers for compressing fuel mixture in the induction chamber and having passages communicating with the storage chamber for forcing the compressed mixture into the storage chamber, means for intermittently releasing the compressed mixture from the storage chamber to said firing chamber, and means on the cylinder for bypassing a portion of the compressed mixture around the piston in the induction chamber.

12. In a rotary internal combustion engine, an annular cylinder, a rotor journaled axially of said cylinder and providing a fuel mixture storage chamber, shiftable abutments dividing said cylinder into induction and firing chambers, pistons carried by the rotor to travel in said cylinder through said latter chambers for compressing fuel mixture in the induction chamber and forcing the compressed mixture into the storage chamber, means for intermittently releasing the compressed mixture from the storage chamber to said firing chamber, means for bypassing a portion of the compressed mixture in the induction chamber, and means for varying the instant of bypassing of the compressed mixture in the induction chamber and regulating the quantity of the compressed mixture forced into the storage chamber.

13. In a rotary internal combustion engine, an annular cylinder, a rotor journaled axially of said cylinder and providing a fuel mixture storage chamber, shiftable abutments dividing said cylinder into induction and firing chambers, pistons carried by the rotor to travel in said cylinder through said latter chambers for compressing fuel mixture in the induction chamber and having passages communicating with the storage chamber forcing the compressed mixture into the storage chamber, means for intermittently releasing the compressed mixture from the storage chamber to said firing chamber, the induction chamber being provided near one end with an inlet passage, and means on the cylinder for bypassing a portion of the mixture compressed in the induction chamber around the piston to the inlet end of such chamber.

14. In a rotary internal combustion engine, an annular cylinder having an induction chamber and a firing chamber, a rotor arranged concentric with the cylinder and providing a storage chamber, a piston fixed on the rotor and movable through said induction chamber for pushing fuel mixture from such chamber into the storage chamber, means on the cylinder for bypassing a portion of the mixture in the induction chamber from the front of the piston to the rear thereof, means whereby a partial vacuum is created behind the piston for aspirating to the rear of the piston the mixture being bypassed, and means for intermittently releasing the mixture from said storage chamber to the firing chamber.

15. In a rotary internal combustion engine, an annular cylinder having an induction chamber and a firing chamber, a rotor providing a storage chamber, a piston fixed on the rotor and movable through said induction chamber for pushing fuel mixture from such chamber into the storage chamber, means for bypassing a portion of the mixture in the induction chamber from the front of the piston to the rear thereof, means whereby a partial vacuum is created behind the piston for aspirating to the rear of the piston the mixture being bypassed, means for intermittently releasing the mixture from said storage chamber to the firing chamber, and means on the cylinder for varying the instant of the bypassing of the mixture.

16. In a rotary internal combustion engine, an annular cylinder having an induction chamber and a firing chamber, a rotor concentric with the cylinder and providing a storage chamber, a piston fixed on the rotor and movable through said induction chamber for pushing fuel mixture from such chamber into the storage chamber, an abutment separating the induction and firing chambers and movable to open position to permit passage of the piston, means on the cylinder for bypassing to the rear of the piston the portion of the mixture remaining in the induction chamber in front of the piston as the piston approaches the abutment, and means for intermittently releasing the mixture from the storage chamber to said firing chamber.

17. In a rotary internal combustion engine, an annular cylinder having an induction chamber and a firing chamber, a rotor concentric with the cylinder and providing a storage chamber, a piston fixed on the rotor and movable through said induction chamber for pushing fuel mixture from such chamber into the storage chamber, an abutment separating the induction and firing chambers and movable to open position to permit the passage of the piston, means on the cylinder for by-passing to the rear of the piston prior to the opening of the abutment the portion of the mixture remaining in the induction chamber in front of the piston, and means for intermittently releasing the mixture from said storage chamber to the firing chamber.

18. In a rotary internal combustion engine, an annular cylinder having an induction chamber and a firing chamber, a rotor providing a storage chamber and having a piston movable through said induction chamber for pushing fuel mixture from such chamber into the storage chamber, an abutment separating the induction and firing chambers and movable to open position to permit of passage of the piston into the firing chamber, means for bypassing to the rear of the piston prior to the opening of the abutment the portion of the mixture remaining in front of the piston, means whereby a partial vacuum is created behind the piston for aspirating to the rear of the piston the mixture being bypassed, and means for intermittently releasing the mixture from said storage chamber to the firing chamber.

19. In a rotary internal combustion engine, an annular cylinder having an induction chamber and a firing chamber, the induction chamber being provided with an inlet passage, a rotor providing a storage chamber and having a piston movable through said induction chamber for pushing fuel mixture from such chamber into the storage chamber, an abutment separating the induction and firing chambers and movable to open position to permit the passage of the piston into the firing chamber, means for by-passing to the rear of the piston prior to the opening of the abutment the portion of the mixture remaining in front of the piston, means for closing said inlet passage whereby a partial vacuum is created behind the piston for aspirating to the rear of the piston the mixture being bypassed, and means for intermittently releasing the mixture from said storage chamber to the firing chamber.

20. In a rotary internal combustion engine, an annular cylinder having an induction chamber and a firing chamber, a hollow rotor having its interior constituting a storage chamber, a hollow piston in communication with the storage chamber and fixed to the periphery of the rotor to move through said induction chamber for pushing fuel mixture under pressure from such chamber through the piston into the storage chamber, a rotary abutment in and transverse to the cylinder and separating the induction and firing chambers and movable to open and closed position to permit the passage of the piston into the firing chamber while the piston crosses the plane of the abutment, and means for intermittently releasing the mixture from said storage chamber to the firing chamber behind the piston.

21. In a rotary internal combustion engine, an annular cylinder provided with an abutment housing and formed at its inner periphery with an annular channel, a rotor having a medial flange slidably fitting in said channel, the flange being formed with longitudinal grooves in its sides, a piston carried by said flange and movable through the cylinder, an expansible packing ring fitted circumferentially to the piston to cooperate with the wall of the cylinder and provided with terminal lugs extending through the rib of the rotor and projecting laterally outward into said grooves, an abutment mounted in said housing and movable to open position to permit of passage of the piston, and cams mounted upon the cylinder at the abutment housing and yieldably engaged in said grooves in the rib of the rotor to coact with the lugs of said piston ring for compressing the ring while the piston travels through said housing.

22. In a rotary internal combustion engine, an annular cylinder provided with an abutment housing, a rotor having a piston movable through the cylinder, an abutment mounted in said housing and shiftable to permit the passage of the piston, an expansible packing ring fitted circumferentially to the piston to coact with the wall of the cylinder and having its ends disposed adjacent the periphery of the rotor, and means on the cylinder to engage the ends of the ring at opposite sides of the piston for limiting the expansion of the ring while the piston travels through said housing.

23. In an internal combustion engine, an abutment housing, an abutment rotatable in said housing and provided peripherally with a notch to accommodate a piston traveling through the abutment, packing members mounted in the sides of the abutment housing and overlying the sides of the abutment, said members having annular portions concentric with the axis of the abutment and constantly covered by the abutment and other annular portions intermittently exposed by said notch and connected with and held against displacement by the abutment covered portions of said members, and yieldable means pressing the packing members against the abutment.

24. In a rotary internal combustion engine, a casing, a hollow rotor mounted concentrically in the casing and constituting a storage chamber, the space between one side of the rotor and the adjacent side of the casing constituting a main intake chamber, an annular cylinder on the casing, an abutment dividing the cylinder into induction and firing chambers, the induction chamber having an inlet communicating with the main intake chamber, a piston carried by the rotor and movable through the induction and firing chambers of the cylinder to compress fuel mixture in the induction chamber and deliver it into the storage chamber, and means for delivering the fuel mixture from the storage chamber to the firing chamber behind the piston, the abutment being movable transversely of the cylinder to permit passage of the piston.

25. In a rotary internal combustion engine, a casing, a hollow rotor mounted concentrically in the casing and constituting a storage chamber, the space between one side of the rotor and the adjacent side of the casing constituting a main intake chamber, an annular cylinder on the casing, an abutment dividing the cylinder into induction and firing chambers, the induction chamber having an inlet communicating with the main intake chamber, a hollow piston carried by the rotor and movable through the induction and firing chambers of the cylinder, the piston having a closed rear side, a valve controlled opening in its front side and passages leading from said opening into the storage chamber in the rotor whereby to compress fuel mixture in the induction chamber and deliver it into the storage chamber, and means for delivering fuel mixture from the storage chamber to the firing chamber behind the piston, the abutment being movable to permit passage of the piston.

26. In a rotary internal combustion engine, a casing, a hollow rotor mounted concentrically in the casing and constituting a storage chamber, the space between one side of the rotor and the adjacent side of the casing constituting a main intake chamber, an annular cylinder on the casing, an abutment dividing the cylinder into induction and firing chambers, the induction chamber having an inlet communicating with the main intake chamber, a piston carried by the rotor and movable through the induction and firing chambers of the cylinder to compress fuel mixture in the induction chamber and deliver it into the storage chamber, and means for delivering the fuel mixture from the storage chamber to the firing chamber behind the piston, the abutment being movable transversely of the cylinder to permit passage of the piston, and a flange on one side of the rotor arranged to ride across the inlet to the induction chamber of the cylinder and cut off or permit flow therethrough.

In testimony whereof we affix our signatures.

ELWYNE O. SHREFFLER. [L. S.]
AARON D. LESAGE. [L. S.]